US011274016B2

(12) United States Patent
Pahlke (10) Patent No.: US 11,274,016 B2
(45) Date of Patent: Mar. 15, 2022

(54) WIRELESS COMMUNICATION IN AN ELEVATOR SYSTEM (71) Applicant: Otis Elevator Company, Farmington, CT (US)

(72) Inventor: Derk Pahlke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 297 days.

(21) Appl. No.: 16/411,504

(22) Filed: May 14, 2019

(65) Prior Publication Data

US 2019/0352124 A1 Nov. 21, 2019

(30) Foreign Application Priority Data

May 15, 2018 (EP) ..................... 18172379

(51) Int. Cl.
  *B66B 1/34* (2006.01)
  *H04W 76/14* (2018.01)
  *H04W 4/14* (2009.01)

(52) U.S. Cl.
  CPC ............. *B66B 1/3461* (2013.01); *H04W 4/14* (2013.01); *H04W 76/14* (2018.02)

(58) Field of Classification Search
  CPC ....... H04W 76/14; H04W 4/14; B66B 1/3461
  See application file for complete search history.

(56) References Cited

U.S. PATENT DOCUMENTS

| 5,202,540 | A | 4/1993 | Auer et al. |
| 5,387,769 | A | 2/1995 | Kupersmith et al. |
| 5,654,531 | A | 8/1997 | Farabee et al. |
| 7,577,420 | B2 | 8/2009 | Srinivasan et al. |
| 9,580,276 | B2 * | 2/2017 | Toutaoui ............... B66B 5/0087 |

(Continued)

FOREIGN PATENT DOCUMENTS

| CN | 201150088 Y | 11/2008 |
| CN | 102354182 A | 2/2012 |

(Continued)

OTHER PUBLICATIONS

European Search Report for application 18172379.2, dated Nov. 19, 2018, 7 pages.

(Continued)

*Primary Examiner* — Tadesse Hailu
(74) *Attorney, Agent, or Firm* — Cantor Colburn LLP (57) ABSTRACT The invention relates to a system and a method of wireless communication for emergency in an elevator system. The wireless communication system comprises the user interface module providing a user interface for a passenger in the elevator car; a first wireless communication module configured to make a first wireless connection with a communication device through a first wireless communication network; a second wireless communication module configured to make a second wireless connection with the communication device through a second wireless communication network; and a control module configured to control the first and second wireless communication modules to set up the first wireless connection and/or the second wireless connection, upon receiving the passenger's input through the user interface module.

9 Claims, 8 Drawing Sheets

(56) References Cited

U.S. PATENT DOCUMENTS

| | | | |
|---|---|---|---|
| 2007/0045051 A1* | 3/2007 | Gerstenkorn | B66B 1/468 |
| | | | 187/380 |
| 2007/0261924 A1* | 11/2007 | Lindberg | B66B 1/3423 |
| | | | 187/391 |
| 2009/0295550 A1* | 12/2009 | Oh | B66B 1/3461 |
| | | | 340/286.06 |
| 2011/0155516 A1* | 6/2011 | Mason | B66B 5/021 |
| | | | 187/384 |
| 2015/0075918 A1* | 3/2015 | Natarajan | B66B 5/0087 |
| | | | 187/308 |
| 2016/0264377 A1* | 9/2016 | Beloin | B66B 1/3461 |
| 2017/0008730 A1* | 1/2017 | Kattainen | B66B 1/3476 |
| 2018/0118507 A1* | 5/2018 | Jyotik | B66B 5/0006 |
| 2018/0186602 A1* | 7/2018 | Herkel | B66B 1/3407 |
| 2018/0282122 A1* | 10/2018 | Sudi | B66B 5/0037 |
| 2019/0161318 A1* | 5/2019 | Wedzikowski | B66B 1/468 |
| 2020/0239272 A1* | 7/2020 | Hanninen | B66B 5/0031 |
| 2020/0239273 A1* | 7/2020 | Hanninen | H04L 67/12 |
| 2021/0198080 A1* | 7/2021 | Lewis | B66B 5/0018 |

FOREIGN PATENT DOCUMENTS

| | | |
|---|---|---|
| CN | 103601045 A | 2/2014 |
| CN | 103910262 A | 7/2014 |
| CN | 203976154 U | 12/2014 |
| CN | 204138071 U | 2/2015 |
| CN | 204280940 U | 4/2015 |
| CN | 104876076 A | 9/2015 |
| CN | 204689295 U | 10/2015 |
| CN | 105236227 A | 1/2016 |
| CN | 106315331 A | 1/2017 |
| CN | 206486131 U | 9/2017 |
| DE | 19858664 A1 | 6/2000 |
| EP | 3190075 A1 | 7/2017 |
| JP | 2003204398 A | 7/2003 |
| KR | 20130057850 A | 6/2013 |
| KR | 101293322 B1 | 8/2013 |
| KR | 20140024166 A | 2/2014 |
| KR | 20150061984 A | 6/2015 |
| WO | 2017198907 A1 | 11/2017 |
| WO | 2017216413 A1 | 12/2017 |

OTHER PUBLICATIONS

Kone, "Wired communications in elevators or Wireless", Kone Corporation, Dec. 8, 2016, 23 pages.

* cited by examiner

WIRELESS COMMUNICATION IN AN ELEVATOR SYSTEM

FOREIGN PRIORITY

This application claims priority to European Patent Application No. 18172379.2, filed May 15, 2018, and all the benefits accruing therefrom under 35 U.S.C. § 119, the contents of which in its entirety are herein incorporated by reference.

BACKGROUND

The invention relates to wireless communication in an elevator system, in particular to an apparatus and a method of wireless communication for emergency situations in the elevator system.

An elevator system comprises at least one elevator car traveling along a hoistway to carry passengers between a plurality of landings. In an emergency situation, e.g. in case of a power outage or a breakdown of the elevator system, the elevator car may not be able to run in a normal and expected way. A passenger experiencing such an emergency situation in the elevator car will need a communication tool to contact a responsible person outside and to report his or her situation. Conventionally, a single wired communication system has been normally used for such a purpose. Quality of service of such a communication system is critical to ensure that the communication system does work even in the event of an emergency situation.

It is therefore desirable to provide a reliable communication system between a passenger experiencing an emergency situation in the elevator car and a responsible person managing the elevator system.

SUMMARY

According to an exemplary embodiment of the invention, a wireless communication system to be used in an elevator system comprises a user interface module placed in an elevator car of the elevator system, the user interface module providing a user interface for a passenger in the elevator car; a first wireless communication module configured to make a first wireless connection with a remote communication device through a first wireless communication network; a second wireless communication module configured to make a second wireless connection with the remote communication device through a second wireless communication network; and a control module configured to control the first and second wireless communication modules to set up the first wireless connection and/or the second wireless connection, upon receiving the passenger's input through the user interface module.

A number of optional features are set out in the following. These features may be realized in particular embodiments, alone or in combination with any of the other features.

The control module may be further configured to try to set up the wireless connection using the first and second wireless connection in a predetermined order.

In particular, the control module may be configured to try to set up either of the first and second wireless connections using the first and second wireless connection modules in a predetermined order. For example, the control module may be configured to try to set up the first wireless connection using the first wireless connection module and then, if this turns out to be unsuccessful, try to set up the second wireless connection using the second wireless connection module.

The user interface module may comprise an emergency button for the passenger to initiate setting up a connection with the remote communication device. The control module may be further configured to send a predefined SMS message to the remote communication device using the first wireless communication module and/or the second wireless communication module, upon sensing the passenger's input through the emergency button.

The first wireless network may be any one of GSM, WCDMA, LTE, and LTE-A networks and the second wireless network may be any one of Low-Power Wide-Area-Networks (LPWAN), Low-Range Wide-Area-Networks (LoRaWAN), WiFi, and Bluetooth networks.

The control module, and the first and second wireless communication modules may be provided in a communication unit located in a place other than the elevator car, e.g. in a head room of the hoistway or in a machine room. The user interface module and the communication unit may be configured to communicate via at least one of a wire communication or a wireless communication with each other.

In particular embodiments, the second wireless communication module may be provided at the elevator car. The control module and/or the first wireless communication module may be placed at the elevator car or elsewhere, e.g. in a head room of the hoistway or in a machine room.

According to another aspect of the invention, an elevator system which is equipped with a wireless communication system according to the claimed embodiments of the present invention, as set out above, is provided.

According to an exemplary embodiment of the invention, a method of setting up a connection between a passenger in an elevator car of an elevator system and a remote communication device, particularly a management center, comprises receiving a user input through a user interface provided in the elevator car; upon receiving the user input, initiating setting up a first wireless connection with the remote communication device over a first wireless network using a first wireless communication module; and/or initiating setting up a second wireless connection with the remote communication device over a second wireless network using a second wireless communication module.

Particularly, initiating setting up the second wireless connection with the remote communication device over the second wireless network using the second wireless communication module may be carried out upon confirming the first wireless network is unavailable.

When the second wireless connection has been set up over the second wireless network, the method further may comprise sending an SMS message to the remote communication device, the SMS message containing an identification number of the elevator car and an alarming notice.

DESCRIPTION OF DRAWINGS

In the following an exemplary embodiment of the invention is described with reference to the enclosed figures.

DETAILED DESCRIPTION

Figure 1:
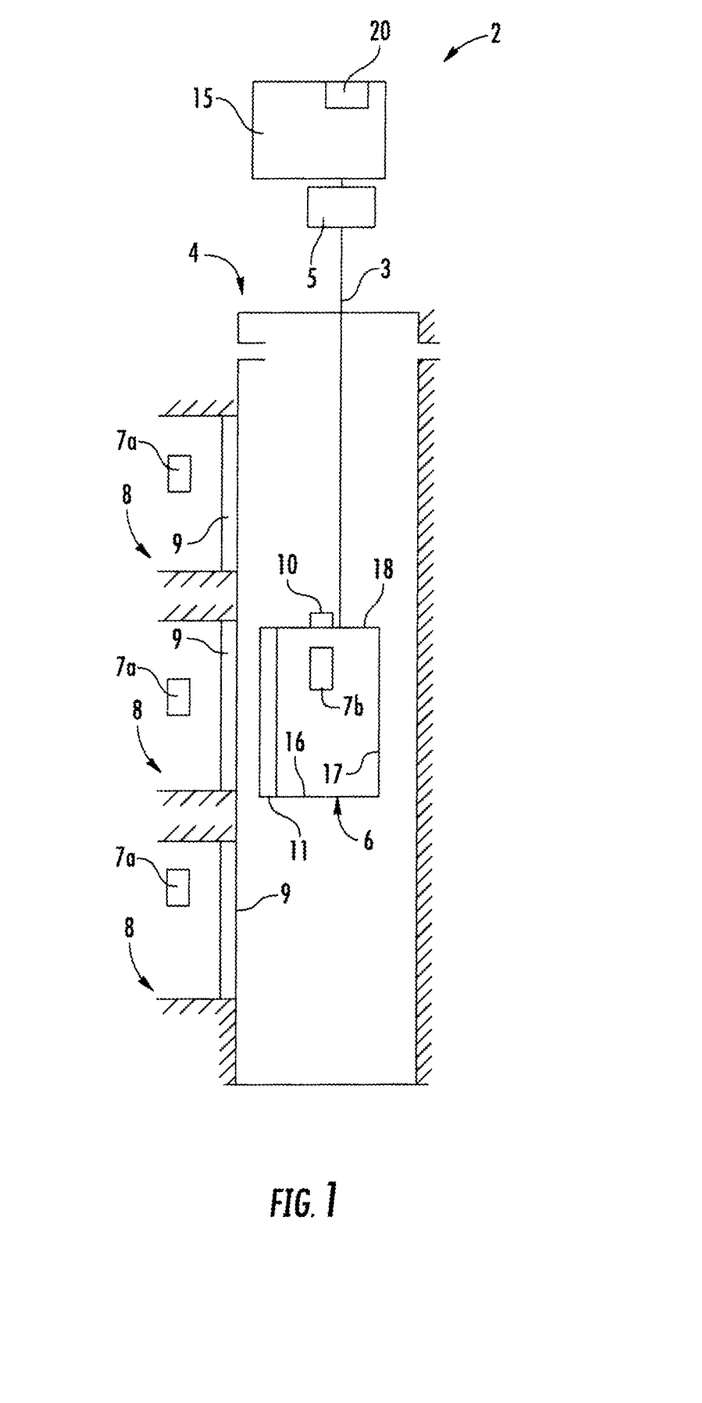
FIG. 1 is a schematic diagram depicting an elevator system comprising an elevator car according to an exemplary embodiment of the invention.

FIG. 1 schematically depicts an elevator system 2 comprising an elevator car 6 according to an exemplary embodiment of the invention.

The elevator system 2 comprises a hoistway 4 extending in a vertical direction between a plurality of landings 8 located on different floors.

The elevator car 6 comprises a floor 16, a ceiling 18 and sidewalls 17 extending between the floor 16 and the ceiling 18 defining an interior space of the elevator car 6. Only one sidewall 17 is depicted in the schematic illustration of FIG. 1.

The elevator car 6 is movably suspended within the hoistway 4 by means of a tension member 3. The tension member 3, for example a rope or belt, is connected to a drive 5, which is configured for driving the tension member 3 in order to move the elevator car 6 along the longitudinal direction/height of the hoistway 4 between the plurality of landings 8.

Each landing 8 is provided with a landing door (elevator hoistway door) 9, and the elevator car 6 is provided with a corresponding elevator car door 11 allowing passengers to transfer between a landing 8 and the interior space of the elevator car 6 when the elevator car 6 is positioned at the respective landing 8.

The drive 5 is controlled by an elevator control 15 for moving the elevator car 6 along the hoistway 4 between the different landings 8.

Input to the elevator control 15 may be provided via elevator hall call panels 7a, which are provided on each landing 8 close to the elevator landing doors 9, and/or via elevator car control buttons which are incorporated into a user interface 7b provided inside the elevator car 6. Instead of traditional up/down hall call panels, the hall call panels 7a may have the configuration of destination call panels including buttons for input of a desired destination floor by the passenger. In this case, the user interface 7b inside the elevator car 6 is not required to have elevator car control buttons for input of the desired destination floor.

The elevator hall call panels 7a and the elevator car control buttons included in the user interface 7a may be connected to the elevator control 15 by means of electrical lines, which are not shown in FIG. 1, in particular by an electric bus, e.g. a field bus such as a CAN bus, or by means of wireless data transmission.

The exemplary embodiment of the elevator system 2 shown in FIG. 1 is provided with the user interface 7b, a first communication unit 10, and a second communication unit 20. The user interface 7b may include an emergency button, a microphone, a speaker, and/or a monitor etc. As described above, the user interface 7b may be implemented together with the elevator car control buttons. Alternatively, the user interface 7b may be located on another place inside the elevator car 6 separately from the elevator car control buttons.

The first communication unit 10 may be provided on the top of the elevator car 6. The first communication unit 10 is configured to interconnect the user interface 7b and the second communication unit 20. The first communication unit 10 and the second communication unit 20 may be connected with each other by a wire, e.g., the CAN bus, or by means of wireless data transmission, e.g. a wireless local area network (WLAN). In FIG. 1, the second communication unit 20 is incorporated into the elevator control 15. However, the second communication unit 20 may be a device separate from the elevator control 15. The second communication unit 20 may be placed in a head room of the hoistway 4 or in a machine room located above or beneath the hoistway 4.

As an alternative, the first communication unit 10 and the second communication unit 20 may be implemented as a single entity. For example, the second communication unit 20 may be incorporated into the first communication unit 10.

The operations of the interface unit 7b, the first communication unit 10, and the second communication unit 20 will be described in detail with reference to FIGS. 2-5.

Figure 2:
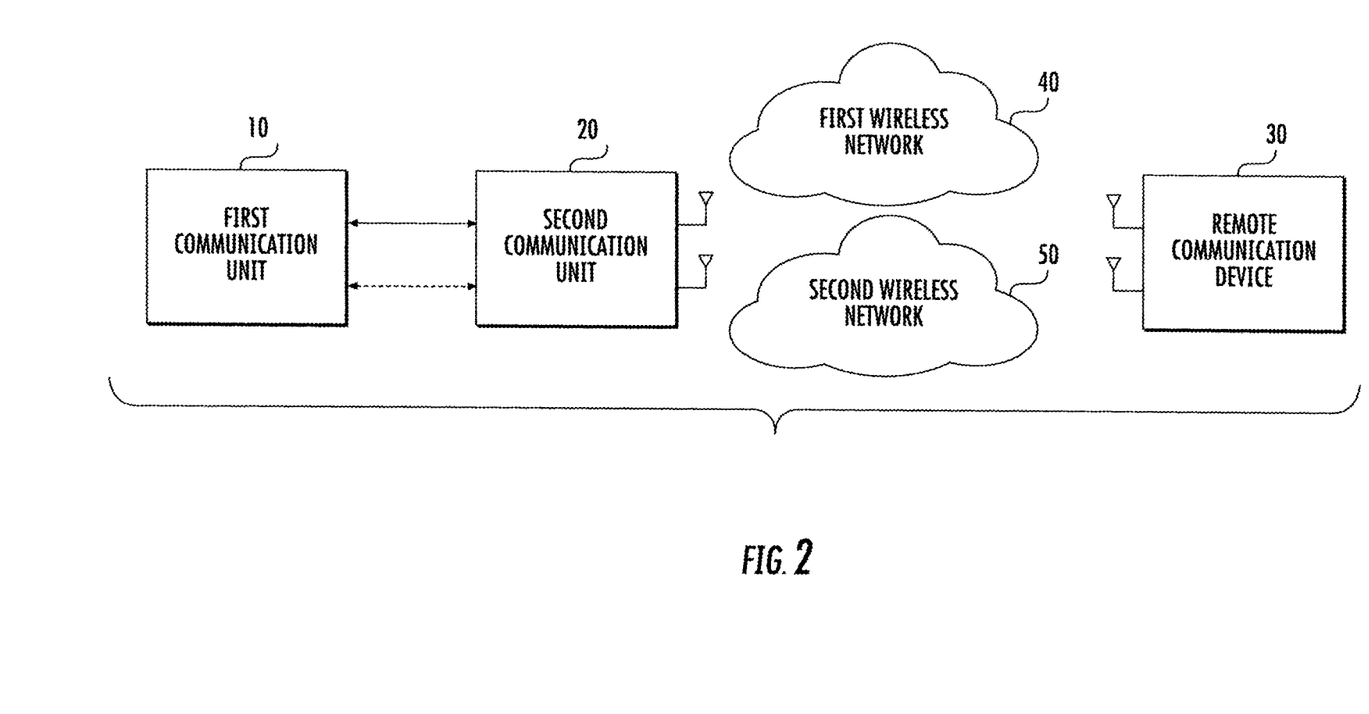
FIG. 2 is a schematic diagram showing an overall network structure in accordance with an embodiment of the present invention.

FIG. 2 is a schematic diagram showing an overall network structure in accordance with an embodiment of the present invention.

Referring to FIG. 2, the first communication unit 10 is connected to the second communication unit 20 by means of a CAN bus or wirelessly, as described above. The second communication unit 20 is configured to be connected with a remote communication device 30 over a first wireless network 40 and a second wireless network 50, respectively. The remote communication device 30 may be provided, for example, in a management center (not shown) which is responsible for managing the elevator system 2, particularly in an emergency situation. Alternatively, the remote communication device 30 may be a mobile device carried by a person who is responsible for managing the elevator system 2 or a passenger's acquaintance. The first wireless network 40 is completely independent of the second wireless network 50.

Figure 3:
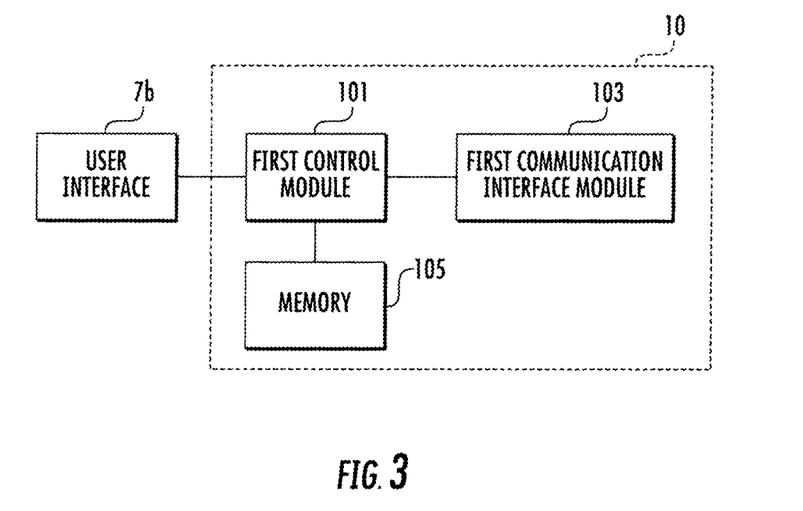
FIG. 3 is a diagram showing an exemplary structure of a first communication unit in accordance with an embodiment of the present invention.
Figure 4:
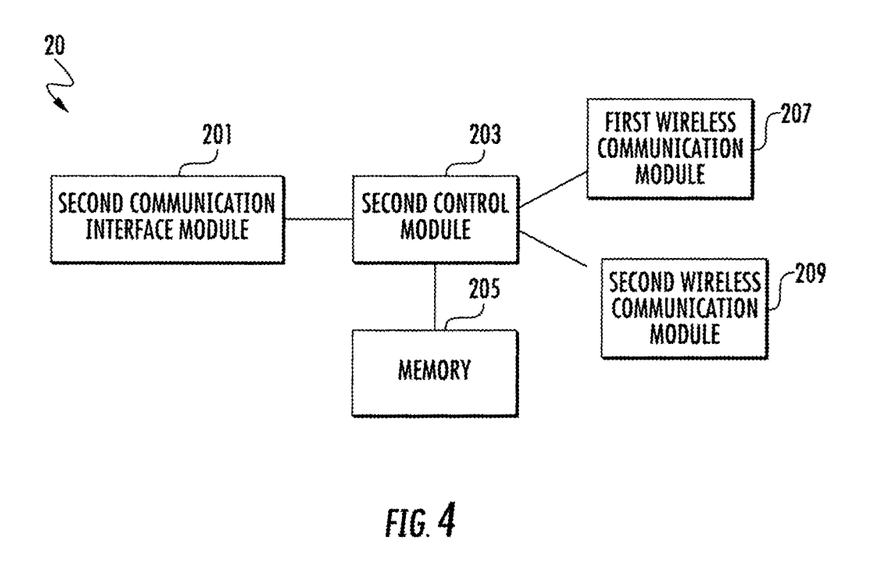
FIG. 4 is a diagram showing an exemplary structure of a second communication unit in accordance with an embodiment of the present invention.
Figure 5:
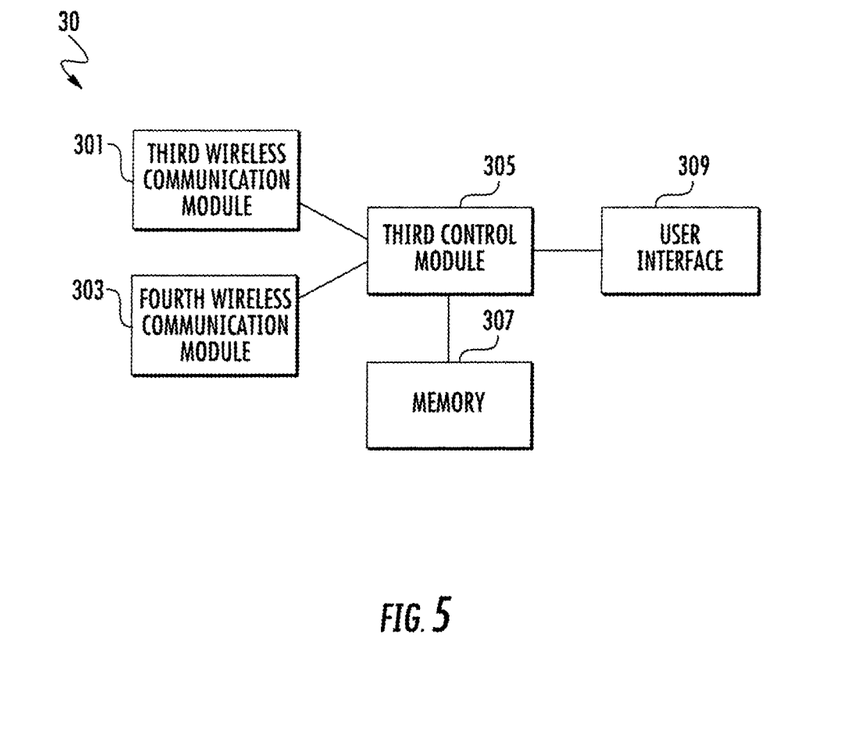
FIG. 5 is a diagram showing an exemplary structure of a remote communication device configured to communicate with a wireless communication system according to embodiments of the present invention.

FIGS. 3-5 are diagrams showing exemplary structures of the first communication unit 10, the second communication unit 20, and the remote communication device 30, respectively, in accordance with an embodiment of the present invention.

Referring to FIG. 3, the first communication unit 10 includes a first control module 101, a first communication interface module 103, and a memory 105. The first control module 101 is connected with the user interface 7b provided inside the elevator car 6 and the first communication interface module 103. Programs, instructions, and data required to control the first communication unit 10 and to communicate with the second communication unit 20 may be stored in the memory 105 which comprises a RAM and a ROM.

Referring to FIG. 4, the second communication unit 20 includes a second communication interface module 201, a second control module 203, a memory 205, a first wireless communication module 207, and a second wireless communication module 209. The second control module 203 is configured to control the second communication interface module 201 to communicate with the first communication unit 10. The first and second wireless communication modules 207, 209 are configured to perform a predefined data processing to communicate with the remote communication device 30 over the first and second wireless networks 40, 50, respectively. The second control module 203 may be configured to also control the first and second wireless communication modules 207, 209. Programs, instructions, and data required to control the second communication unit 20 and to communicate with the first communication unit 10 and the remote communication device 30 may be stored in the memory 205 which may also comprise a RAM and a ROM.

The first communication unit 10 may be connected with the second communication unit 20 by means of electrical lines, in particular by an electric bus, e.g. a field bus such as a CAN bus, or by means of wireless data transmission. The first and second communication interface modules 103, 201 are configured to perform a predefined data processing necessary for communicating with each other, in accordance with a communication protocol depending on a communication medium between the first and second communication units 10, 20.

Referring to FIG. 5, the remote communication device 30 includes a third wireless communication module 301, a fourth wireless communication module 303, a third control module 305, a memory 307, and a user interface 309. The third and fourth wireless communication modules 301, 303 are configured to perform a predefined data processing to communicate with the first and second wireless communication modules 207, 209 of the second communication unit 20, respectively. The third control module 305 is configured to control overall operations of the remote communication device 30. The user interface 309 may comprise a microphone, a speaker, a monitor, and/or a keypad for a user of the communication device 30.

Figure 6:
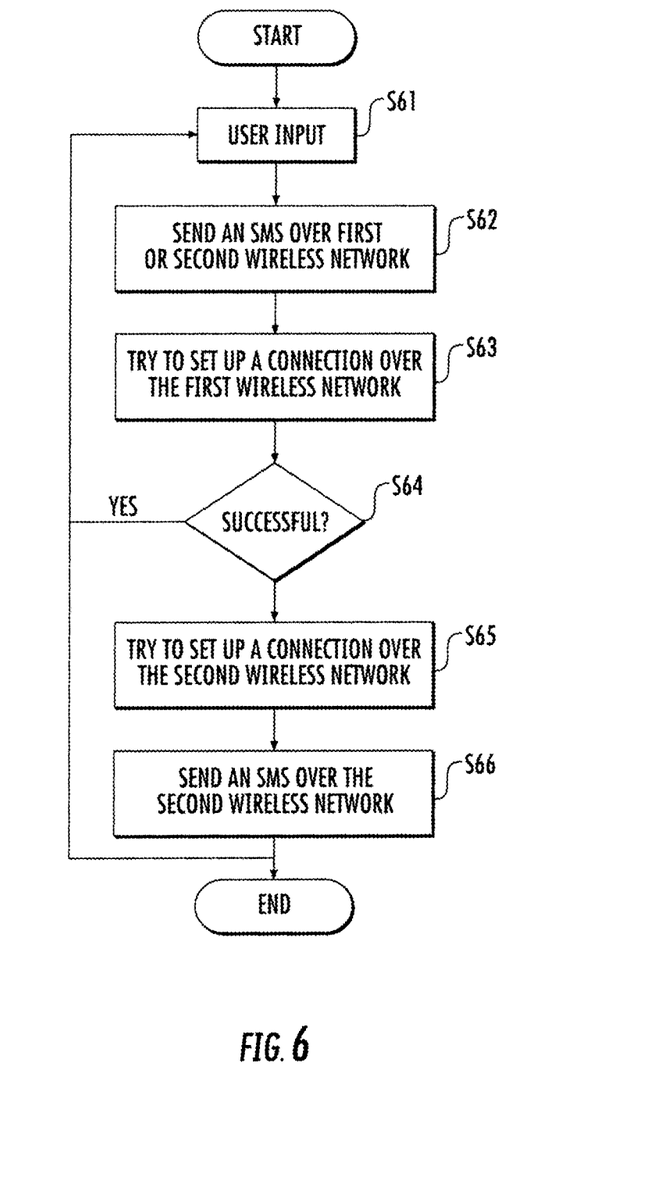
FIG. 6 is a flowchart showing a process of setting up a wireless connection between a passenger in an elevator car and a remote communication system in accordance with embodiments of the present invention.

FIG. 6 is a flowchart showing a process performed by the second control module 203 of the second communication unit 20 in accordance with the embodiment of the present invention described above.

Referring to FIG. 6, when a passenger experiencing an emergency situation in the elevator car 6 makes a request of making a connection with a manager of the elevator system 2 through the user interface 7b, at S61, the user input is transferred to the second control unit 203 of the second communication unit 20 via the first communication unit 10. The user input can be made by the passenger, for example, by simply pushing the emergency button or by picking up a handset provided in the user interface 7b. The user input is transferred to the second control module 203 via the first and second communication interfaces 103, 201.

In some embodiments, when receiving the user input, at S62, the second control module 203 may send an SMS message to the remote communication device 30 over the first and/or second wireless communication network 40, 50 to inform that an emergency situation occurred in the elevator car 6. Alternatively, the second control module 203 may send the SMS message to the remote communication device 30 in a different order, e.g., after confirming that the first wireless communication network 40 is unavailable, the second control module 203 may send the SMS message to the remote communication device 30 via the second wireless network 50.

At S63, the second control module 203 tries to set up a wireless connection with the remote communication device 30 over the first wireless network 40 using the first wireless communication module 207. This step may be performed a predetermined plurality of times. The first wireless network 40 may be any of GSM, WCDMA, LTE, and LTE-A networks which are all well-known second to fourth generation wireless networks. The first wireless communication module 207 performs a data processing according to a communication protocol predefined by a corresponding technical standard of the GSM, WCDMA, LTE, or LTE-A network.

At S64, the second control module 203 determines if the step of S63 is successful, i.e., if the wireless connection with the remote communication device 30 has been successfully set up. If it turns out to be successful at S64, the second control module 203 returns to a waiting mode to wait for another user input.

If it turns out to be unsuccessful at S64, the second control module 203 tries to set up a wireless connection with the remote communication device 30 over the second wireless network 50 at S65 using the second wireless communication module 209. The second wireless network 50 may any one of LPWAN (Low-Power Wide-Area Network, also abbreviated "LPWA" or "LPN"), LoRaWAN (Low-Range Wide-Area Network), Wi-Fi, and Bluetooth networks. The second wireless communication module 209 performs a known data processing according to a communication protocol predefined in a corresponding technical standard, e.g. the technical standard of LPWAN. The LPWAN is a type of wireless telecommunication wide area network designed to allow long range communications at a low bit rate with low power. An example for an LPWAN available in Europe is the SigFox network.

When a wireless connection has been established between the second communication unit 20 and the remote communication device 30 over the first wireless network 40, e.g., over the GSM, WCDMA, LTE, or LTE-A network, the passenger in the elevator car 6 can communicate with, for example, the manager using the remote communication device 30 using the established wireless connection.

When the wireless connection has been established between the second communication unit 20 and the remote communication device 30 over the second wireless network 50, e.g., over the LPWPN, at S66, a short message like an SMS may be transmitted to the remote communication device 30 to inform that a passenger is under an emergency situation. Upon sensing the user input by the user interface 7b, the short message may be automatically produced by either the first control module 101 or the second control module 203 and then sent to the remote communication device 30. The short message may contain an identification number of the elevator car 6 and an alarming notice.

Figure 7:
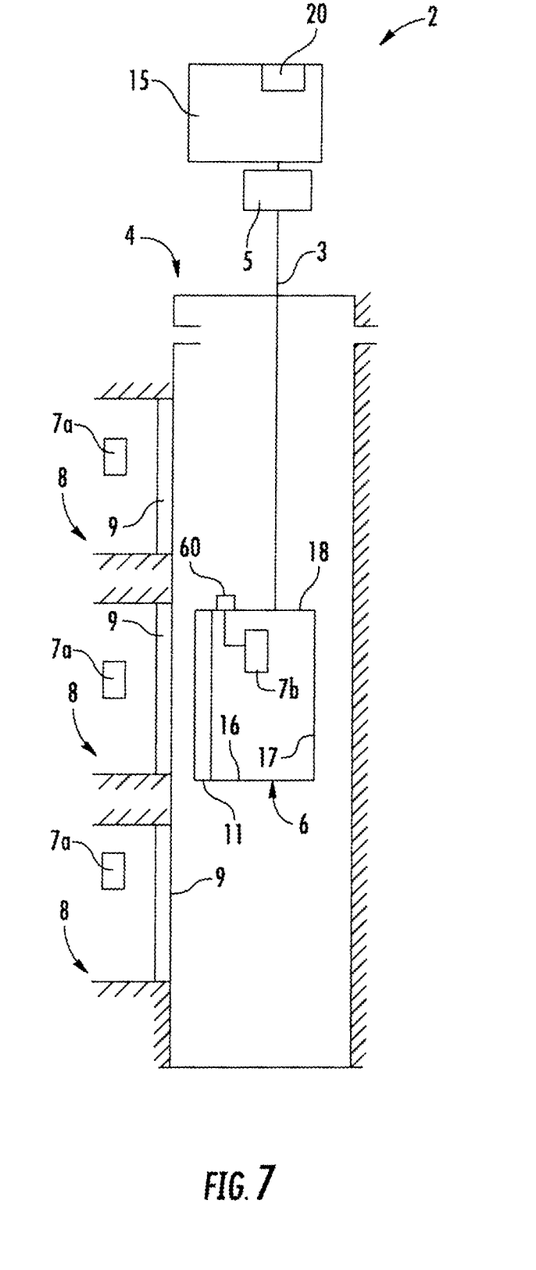
FIG. 7 is a schematic diagram depicting an elevator system comprising an elevator car according to a further exemplary embodiment of the invention.
Figure 8:
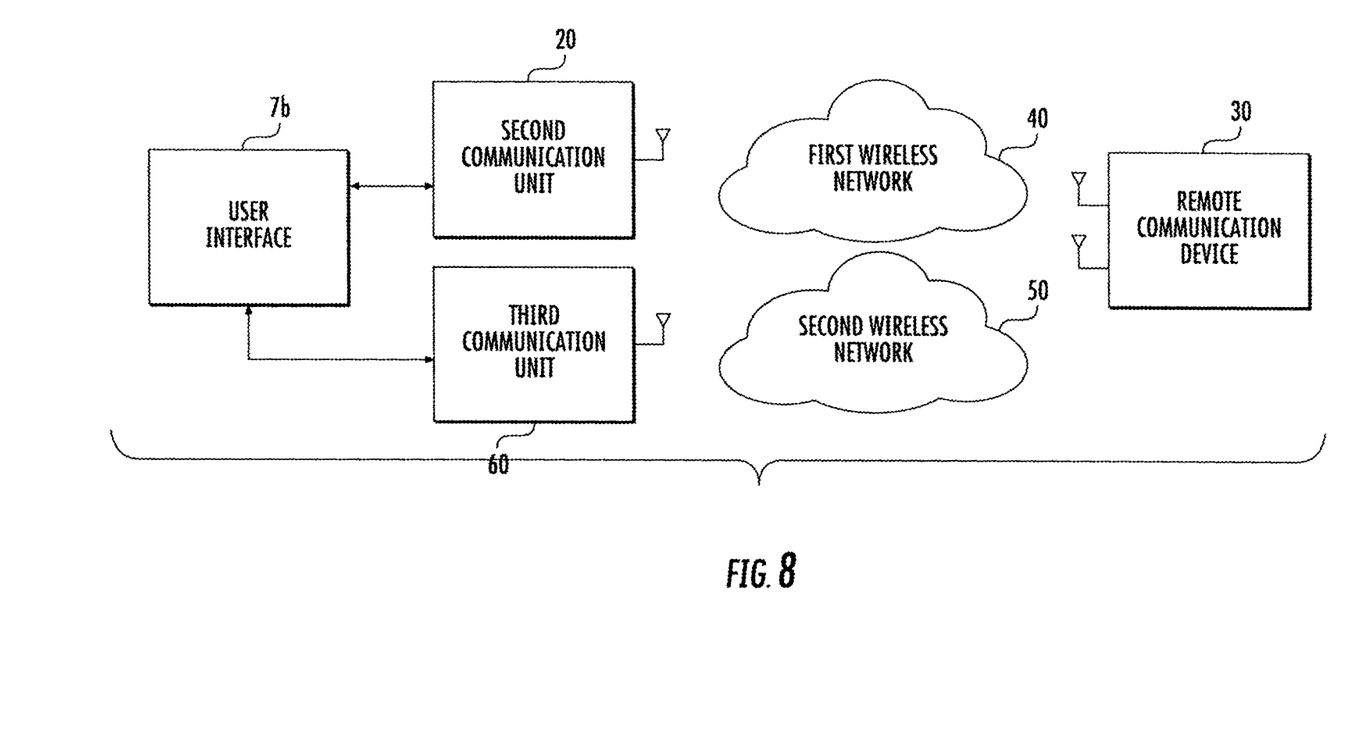
FIG. 8 is a schematic diagram showing an overall network structure in accordance with the further embodiment of the present invention.

FIG. 7 is a schematic diagram depicting an elevator system comprising an elevator car according to a further exemplary embodiment of the invention. FIG. 8 is a schematic diagram showing an overall network structure in accordance with the further embodiment of the present invention.

Unlike the embodiment shown in FIGS. 1 and 2, in FIGS. 7 and 8, the first communication unit 10 is incorporated into the second communication unit 20, so that the second communication unit 20 is dedicated to communicating with the remote communication device 30 over the first wireless network 40.

The embodiment of FIGS. 7 and 8 also differs from that shown in FIGS. 1 and 2 in that a third communication unit 60 is provided separately from the second communication unit 20. The third communication unit 60 is an independent communication entity to communicate with the remote communication device 30 over the second wireless network 50 and may be placed on the top of the elevator car 6.

Referring to FIGS. 7 and 8, the second communication unit 20 and the third communication unit 60 have wired or wireless connections with the user interface 7b, respectively. When a passenger's input is sensed through the user interface 7b, the second communication unit 20 and the third communication unit 60 independently initiate setting up wireless connections with the remote communication device 30 over the first wireless network 40 and the second wireless network 50, respectively. Alternatively, the user interface 7b or another separate control module may control the second and third communication units 20, 60 to set up the wireless connections with the remote communication device 30 over the first and second wireless networks 40, 50, respectively, in a predefined order, as described in the embodiment of FIGS. 1-6.

The remote communication device 30 according to the further embodiment has the same configuration as the remote communication device 30 shown in FIG. 5 and described above with reference to FIG. 5.

The flowchart of FIG. 6 also applies to the process performed according to the further embodiment as well, considering that the third communication unit 60 is used to set up the second wireless connection with the remote communication device 30 over the second wireless network 50.

The first wireless network 40 may be any one of GSM, WCDMA, LTE, and LTE-A networks and the second wireless network 50 may any one of LPWAN, LoRaWAN, Wi-Fi, and Bluetooth networks.

The user interface 7b may contain two separate user input means, e.g., a handset and an emergency button, each of which is connected with the second communication unit 20 and the third communication unit 60. As another embodiment, the third communication unit 60 may be connected with a sensor (not shown in the Figures) which can monitor vibrations of the elevator car 6. When the sensor senses an unusual vibration of the elevator car 6, the third communication unit 60 may set up a wireless connection with the remote communication unit 30 over the second wireless network 50 and, for example, may send a predefined SMS message to it.

Figure 9:
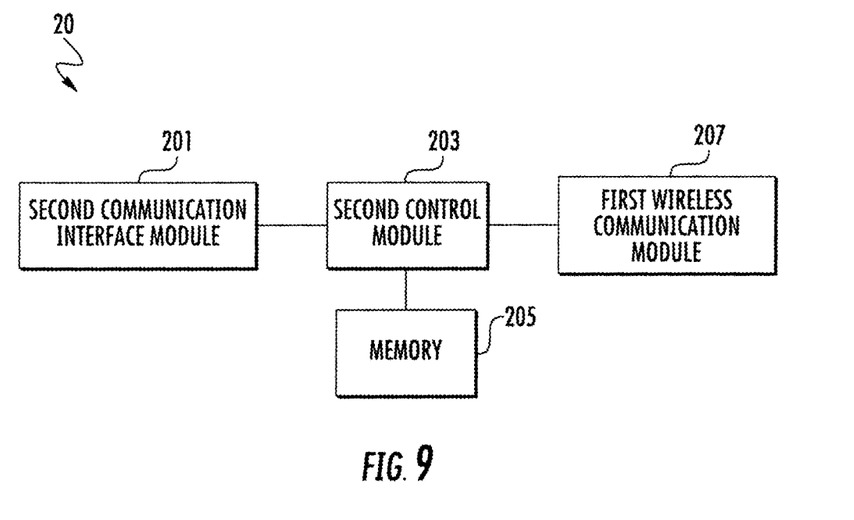
FIG. 9 is a diagram showing an exemplary structure of a second communication unit in accordance with the further embodiment of the present invention.
Figure 10:
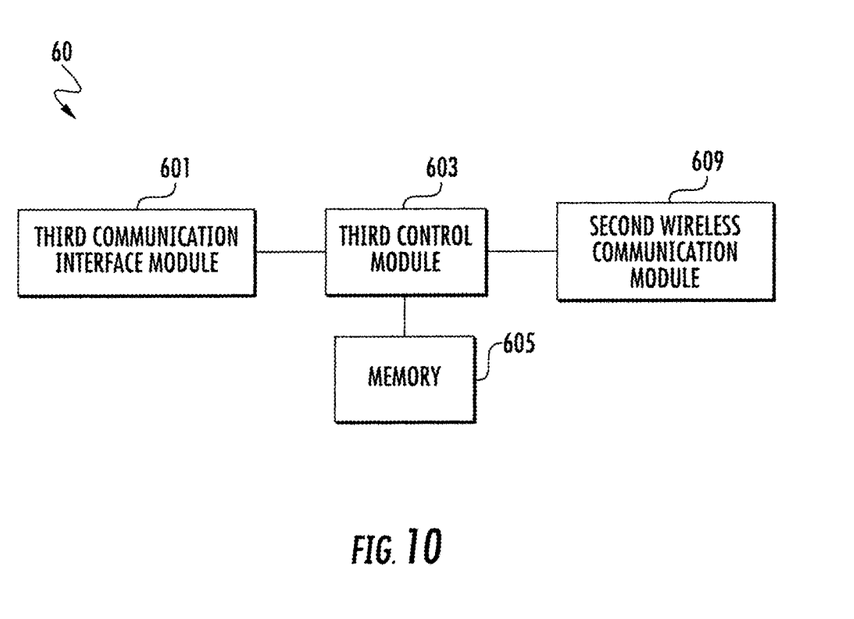
FIG. 10 is a diagram showing an exemplary structure of a third communication unit in accordance with the further embodiment of the present invention.

FIGS. 9 and 10 are diagrams showing exemplary structure of the second communication unit 20 and the third communication unit 30, respectively, in accordance with the further embodiment of the present invention.

Referring to FIG. 9, the second communication unit 20 includes a second communication interface module 201, a second control module 203, a memory 205, and a first wireless communication module 207. The second communication interface module 201 is connected with the user interface 7b. With respect to the operations of the other elements of FIG. 5, reference can be made to FIG. 4 and the descriptions thereof.

Referring to FIG. 10, the third communication unit 60 includes a third communication interface module 601, a third control module 603, a memory 605, and second wireless communication module 609. The third communication interface module 601 is connected with the user interface 7b to receive a user input. The third control module 603 is configured to control overall operations of the third communication unit 60. The second wireless communication module 609, with the control of the third control module 603, is configured to perform a predefined data processing to communicate with the remote communication device 30 over the second wireless network 50. Programs, instructions, and data required to control the third communication unit 60 and to communicate with the remote communication device 30 may be stored in the memory 605 which may also comprise a RAM and a ROM.

According to the embodiments of the present invention, although the first wireless network 40 loses connectivity for some reasons, a secure communication tool can be provided with an elevator passenger who is experiencing an emergency situation in an elevator car 6. This results in avoiding a physical on site visit and a shut down of the elevator until the connectivity of the first wireless network 40 recovers.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 2 elevator system
3 tension member
4 hoistway
5 drive
6 elevator car
7a elevator hall call panel
7b user interface
8 landing
9 landing door frame
10 first communication unit
11 elevator car door
15 elevator control
16 floor of the elevator car
17 sidewall of the elevator car
18 ceiling of the elevator car
20 second communication unit
30 remote communication device
40 first wireless network
50 second wireless network
60 third communication unit
101 first control module
103 first communication interface module
105, 205, 307, 605 memory
201 second communication interface module
203 second control module
207 first wireless communication module
209, 609 second wireless communication module
301 third wireless communication module
303 fourth wireless communication module
305 third control module
309 user interface
601 third communication interface module
603 third control module

What is claimed is:

1. A wireless communication system for an elevator system, the system comprising:
    a user interface module placed in an elevator car of the elevator system, the user interface module providing a user interface for a passenger in the elevator car;
    a first wireless communication module configured to make a first wireless connection between the user interface module and a remote communication device through a first wireless communication network;
    a second wireless communication module configured to make a second wireless connection between the user interface module and the remote communication device through a second wireless communication network; and
    a control module configured to control the first and second wireless communication modules to set up the first wireless connection and/or the second wireless connection, upon receiving the passenger's input through the user interface module;
    wherein the user interface module comprises an emergency button for the passenger to initiate setting up the first wireless connection or the second wireless connection;
    wherein the control module is configured to try to set up the first wireless connection using the first wireless connection module, and to set up the second wireless connection using the second wireless connection module in case setting up the first wireless connection turns out to be unsuccessful;
    wherein the control module is further configured to send a predefined SMS message to the remote communication device using the first wireless communication module and/or the second wireless communication module, upon sensing the passenger's input through the emergency button.

2. The wireless communication system according to claim 1, wherein the first wireless network is any of GSM, WCDMA, LTE and LTE-A networks.

3. The wireless communication system according to claim 1, wherein the second wireless network is any of Low-Power Wide-Area Network (LPWAN), Low-Range Wide-Area-Network (LoRaWAN), Wi-Fi, and Bluetooth networks.

4. The wireless communication system according to claim 1, wherein the first and second wireless communication modules are provided in a communication unit located in a place other than the elevator car.

5. The wireless communication system according to claim 4, wherein the user interface module and the communication unit are configured to make at least one of a wire communication or a wireless communication.

6. The wireless communication system according to claim 1, wherein the second wireless communication module is provided at the elevator car.

7. The wireless communication system according to claim 1, wherein the remote communication device is configured to be used by a person who is responsible for managing the elevator system.

8. An elevator system equipped with the wireless communication system according to claim 1.

9. A method of setting up a wireless connection between a passenger in an elevator car of an elevator system and a remote communication device, the method comprising:
    receiving a user input through a user interface provided in the elevator car;
    upon receiving the user input, initiating setting up a first wireless connection between the user interface module and the remote communication device over a first wireless network using a first wireless communication module; and setting up a second wireless connection between the user interface module and the remote communication device over a second wireless network using a second wireless communication module;
    upon confirming the first wireless network is unavailable, initiating setting up the second wireless connection with the remote communication device over the second wireless network using the second wireless communication module;
    when the second wireless connection has been set up over the second wireless network, sending an SMS message to the remote communication device, the SMS message containing an identification number of the elevator car and an alarming notice.

* * * * *